US010446066B2

(12) United States Patent
Frey

(10) Patent No.: US 10,446,066 B2
(45) Date of Patent: Oct. 15, 2019

(54) ROUND TUBE CLADDING FOR PANEL-FRAME INTERFACE

(71) Applicant: MOSS HOLDING COMPANY, Elk Grove Village, IL (US)

(72) Inventor: Robert M. Frey, Salt Lake City, UT (US)

(73) Assignee: Moss Holding Company, Elk Grove Village, IL (US)

(*) Notice: Subject to any disclaimer, the term of this patent is extended or adjusted under 35 U.S.C. 154(b) by 0 days.

(21) Appl. No.: 15/553,978

(22) PCT Filed: Feb. 25, 2016

(86) PCT No.: PCT/US2016/019647
§ 371 (c)(1),
(2) Date: Aug. 25, 2017

(87) PCT Pub. No.: WO2016/138314
PCT Pub. Date: Sep. 1, 2016

(65) Prior Publication Data

US 2018/0075787 A1 Mar. 15, 2018

Related U.S. Application Data

(60) Provisional application No. 62/121,354, filed on Feb. 26, 2015.

(51) Int. Cl.
*G06F 15/00* (2006.01)
*G09F 15/00* (2006.01)

(52) U.S. Cl.
CPC ...... *G09F 15/0018* (2013.01); *G09F 15/0012* (2013.01); *G09F 15/0037* (2013.01); *G09F 15/0068* (2013.01); *G09F 15/0062* (2013.01)

(58) Field of Classification Search
CPC .................... G09F 15/0018; G09F 2015/0093
USPC .................................................... 40/603, 604
See application file for complete search history.

(56) References Cited

U.S. PATENT DOCUMENTS 8,015,736 B2 * 9/2011 Frey .......................... G09F 7/00 40/549
2009/0007473 A1 * 1/2009 Gimpel ............... G09F 15/0018 40/604
2010/0077686 A1 * 4/2010 Bowen .................... E04B 9/303 52/506.06

(Continued)

*Primary Examiner* — Joanne Silbermann
(74) *Attorney, Agent, or Firm* — Lance M. Pritikin

(57) ABSTRACT

Cladding elements are provided to facilitate the creation of crisp joint edges between adjacent tensioned panels on display systems built with round tubular frame members. A cladding element is elongated, and includes a pair of gasket grooves and a frame alignment channel. The alignment channel receivingly engages a portion of the outer surface of a round tubular frame member, and is affixed thereat. Each groove has a mouth portion disposed oppositely of a floor portion, and an inner wall disposed oppositely of an outer wall. The grooves securingly receive a mounting gasket of a respective fabric panel. The grooves are preferably canted toward one another. The outer walls of the grooves may define a unitary slot outward of the mouth portions. The inner walls may intersect one another, and a web portion may extend between the floor portions, thereby defining a closed contour in combination with the two inner walls.

22 Claims, 8 Drawing Sheets

(56) References Cited

U.S. PATENT DOCUMENTS

| | | | | |
|---|---|---|---|---|
| 2012/0145656 | A1 * | 6/2012 | Lin | G09F 15/0012<br>211/46 |
| 2015/0027014 | A1 * | 1/2015 | Smith | G09F 23/00<br>40/607.03 |

* cited by examiner

ROUND TUBE CLADDING FOR PANEL-FRAME INTERFACE

RELATED APPLICATIONS

This application is a U.S. National Stage of International Application No. PCT/US2016/019647 filed Feb. 25, 2016, which claims the benefit of U.S. Provisional Application No. 62/121,354 filed Feb. 26, 2015, the contents of each of which are incorporated by this reference for all purposes as if fully set forth herein.

TECHNICAL FIELD

The present invention relates generally to the field of portable display systems. More particularly, the invention concerns mechanisms for facilitating connection of fabric display panels to frame members having a round (e.g., circular or otherwise elliptical cross section) to form part of a portable display structure, such as those commonly used for decoration and advertising in retail establishments, trade shows, special events, and the like.

BACKGROUND

Portable display systems incorporating extruded Aluminum frameworks and fabric graphic panel walls are well known. In such systems, the fabric display panel typically includes a series of gaskets disposed about its periphery, the gaskets being insertable into grooves which extend and open laterally from respective frame members.

Applicant's round tube construction with a pillowcase style fabric skin was introduced over two decades ago and is now copied by most of Applicant's competitors. Further, over the last six years Applicant's Moss Groove (MG) style of construction, with fabric skins attached on each side of a structure via a gasket that is sewn to the edges of the skin, has rapidly grown in popularity due to its ease of assembly, ease of graphic panel change out, and cleaner looking finishing.

Conventional fabric panel-groove interface systems tend involve a gasket-receiving channel formed as an integral part of an aluminum frame member extrusion. The presence of such channel features generally requires a more complex aluminum frame member profile. More complex extrusion profiles tend to increase the weight and cost of the respective frame members, and typically results in a frame member which is much more difficult to bend into complex shapes. This is because the bending processes used on Aluminum extrusions cause the fabric insertion channel to deform and be rendered unusable. As a result, conventional groove-mount fabric panel constructions are generally limited to frame members that are straight or only minimally curved.

In contrast, round tube construction typically employs a simple round tube aluminum profile. Such profiles generally result in extruded frameworks which are lighter weight and lower cost compared to extruded frame members with more complex cross sections. Moreover, frame members having a circular cross sectional profile tend to have greater post-extrusion formability characteristics, making it ideal for very complex bent shapes. However, such frame systems are conventionally used only with pillowcase covers that wrap the entire frame, or with graphics that are attached to the frame with hook-and-loop fastener elements. Pillowcase covers tend to be more costly to manufacture and harder to install and modify on very large structures. Hook-and-loop fastener elements are generally not preferred as a graphic attachment method due to their poor aesthetics and difficult installation.

What are needed are improvements in systems, kits and methods for facilitating the connection of fabric panels to extruded frameworks having round (circular or elliptical) extrusion profiles and complex frame curvatures.

SUMMARY

Disclosed herein are framework cladding elements and associated components and methods which overcome deficiencies recognized in prior art fabric panel display systems.

By way of example, a cladding elements are provided to facilitate sharp joint edges between adjacent tensioned panel elements on display systems with round tubular frame members. The cladding elements comprise a longitudinal axis along which the cladding element is elongated, a pair of gasket grooves, and a frame alignment channel. Each gasket groove extends parallel with the longitudinal axis, and has a floor portion, a mouth portion disposed oppositely of the floor portion, an outer wall and an inner wall disposed oppositely of the outer wall. These grooves are configured to securingly receive a mounting gasket of a respective fabric panel element. The frame alignment channel is configured to receivingly engage a portion of the outer surface of a round tubular frame member.

The gasket grooves of a cladding element are preferably canted toward one another. The outer walls of the gasket grooves may define a unitary slot outward of the mouth portions. The inner walls may intersect one another, and a web portion may extend between the floor portions, thereby defining a closed contour in combination with the two inner walls. The cladding element may be affixed to the respective tubular frame member through various means, including adhesive foam tape, screws and rivets.

The teachings provided herein facilitate the ability to create fabric panel display systems with more complex and dramatic shapes, including twists and cross-sections with four or more sides at various intersection angles. All of this can be achieved while maintaining the appearance of crisp joint edges between adjacent fabric panels. Specially-configured corner cladding elements and corner gaskets also facilitate a more finished appearance at corner joints of the display systems.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 15:
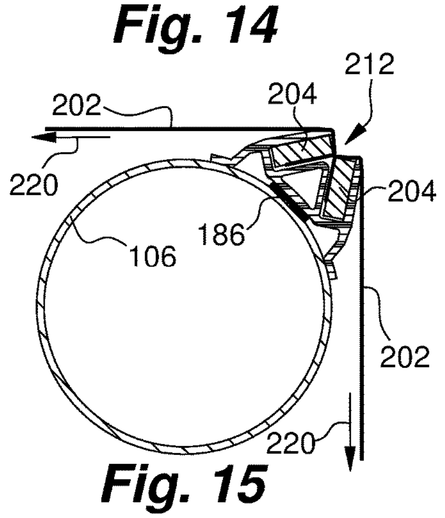
FIG. 15 is a diagrammatic partial cross-sectional view of an assembled display system incorporating a tubular frame member, a cladding element of FIG. 13, and two panel elements mounted in tension.
Figure 20:
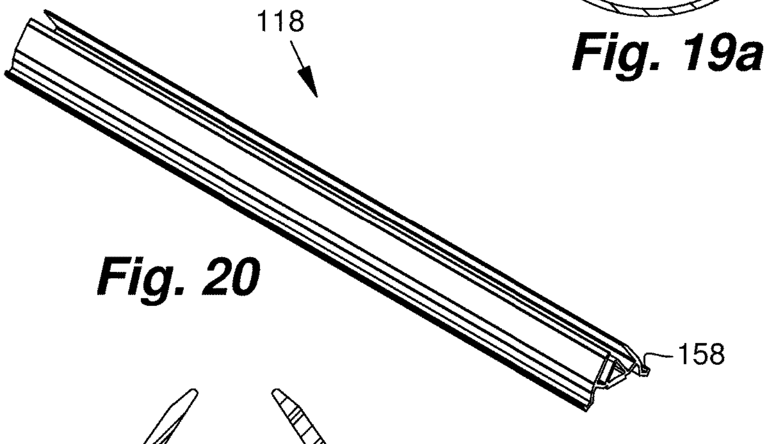
Figure 21:
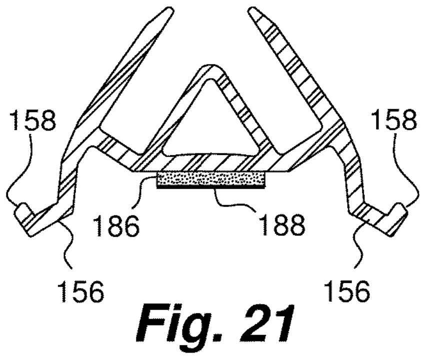
Figure 22:
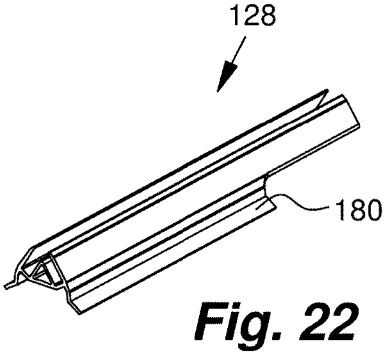
Figure 23:
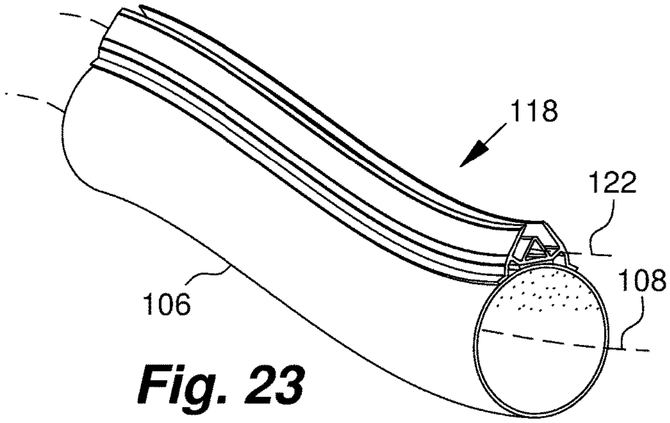
Figure 26:
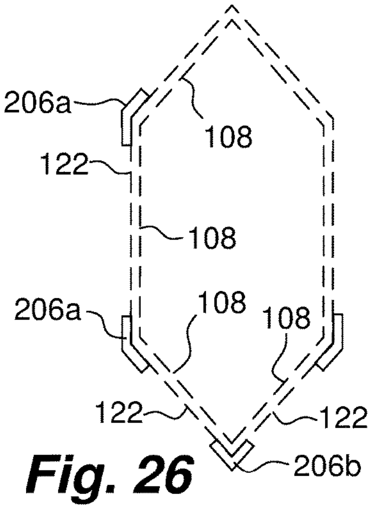
Figure 24:
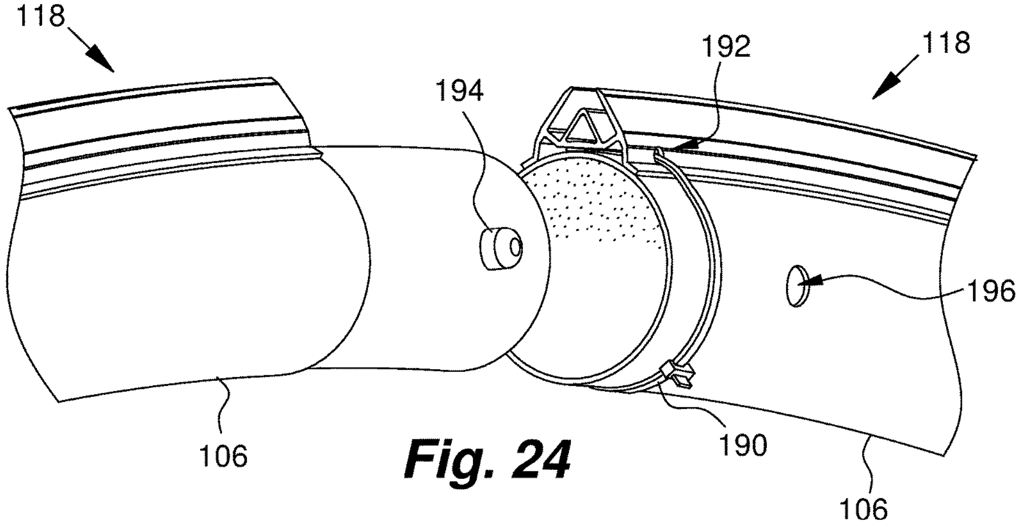
Figure 25:
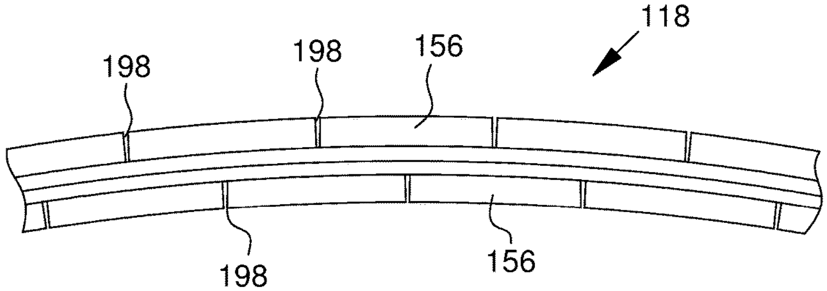

FIG. **19*a* is a diagrammatic partial cross-sectional view of an assembled display system similar to that of FIG. 15**, but wherein the angle between the tensioned panels is greater than 180 degrees, creating an inside corner of a display system;

FIG. 20 is a diagrammatic perspective view of an alternate embodiment of a cladding element which includes a tow flange;

FIG. 21 is a diagrammatic cross-sectional view of the cladding element of FIG. 20;

FIG. 22 is a diagrammatic perspective view of a further embodiment of a corner cladding element, wherein an extended foot flange is provided to facilitate riveted securement of the cladding element to the tubular frame member;

FIG. 23 is a diagrammatic partial perspective view of a curved tubular frame member with one example of a cladding element affixed thereto;

FIG. 24 is a diagrammatic partial perspective view of a male-female round tube in-line frame break, illustrating a wire tie securing an end of the cladding element onto the female side of the frame joint;

FIG. 25 is a top plan view of one example cladding element including lateral stress relief cuts to facilitate the lateral curving of the cladding element without causing excessive deformation of the mounting grooves; and FIG. 26 is a diagrammatic partial cross-sectional view of component axes of one alternative display system, wherein adjacent round tube frame members are connected at angles greater than and less than 90 degrees, and the angle between the gasket legs of corresponding corner gaskets are adapted accordingly.

DETAILED DESCRIPTION OF THE PREFERRED EMBODIMENTS

Referring now to the drawings, like reference numerals designate identical or corresponding features throughout the several views.

Systems, kits and methods in accordance with the present invention generally involve cladding elements which facilitate the securement of groove-mountable gasketed fabric panels onto frameworks comprising round tube frame members forming large, complex 3D shapes.

Cladding elements for round tube frame members in accordance with the present invention blend the desirable features of groove mount panel-frame construction with the desirable forming capabilities of round tube construction. Preferred embodiments of a cladding element may include one or more of the following features or advantages: (a) formable in a manner complimentary to the outer shape of the complex round tube; (b) capable of securely retaining the gasketed fabric panels that need to be held under tension; (c) easy and quick to install on the round tube frame; (d) durable to survive the rigors of transportation and repeated setup and tear-down; and (e) cost effective.

Cladding elements may be formed of plastic (e.g., PVC) extrusion so as to meet all the desirable performance requirements through careful engineering of the extrusion material, the design of the profile, and the application of a pressure sensitive adhesive.

Embodiments of the cladding elements discussed herein may be particularly desirable when removal/replacement of one side of the cover or a square edge on a complex shape is desired. Also, very complex shapes may benefit from a better fabric fit that could be achieved when each panel can be adjusted independent of the other sides.

In certain preferred embodiments, the cladding elements (118 or 128) may be PVC plastic extrusions. The particular PVC resin used may be selected for its flexibility (e.g., to conform to round or curved tube shape), strength (e.g., ability to hold the fabric panels in tension), durability (e.g., withstand impacts from shipping & repeated setups and tear-downs), and cost (e.g., PVC is a readily available and cost-effective plastic resin).

In certain preferred embodiments, the shape of the cladding element is configured to retain two fabric panels at a corner edge of a display system 100 and to minimize any gapping of the fabric panels even as the extrusion is bent and twisted to match the shape of the underlying round, aluminum tube frame. The PVC extrusion is preferably bendable in all four of the X-Y coordinate directions to the minimum radius that the underlying aluminum tube can be bent.

Figure 18:
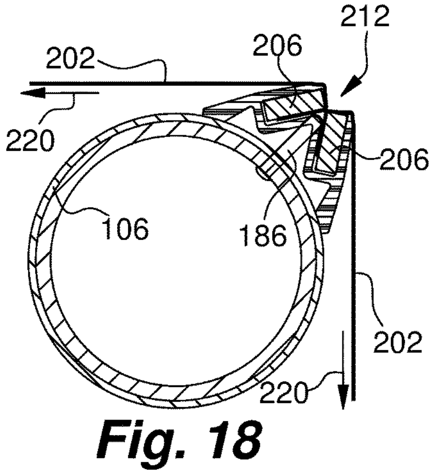
FIG. 18 is a diagrammatic partial cross-sectional view of an assembled display system incorporating a tubular frame member, a cladding element of FIG. 16, and two panel elements mounted in tension.

In preferred embodiments, plastic extrusion wall thicknesses of the cladding elements may be optimized to again allow the flexibility needed to form shapes but the strength to hold the fabric panels in tension. With reference to FIGS. 15, 18 and 21 for example, in particular preferred embodiments, the cross-sectional profile shape of the cladding element may employ an outer “brace leg” that stabilizes and supports the PVC extrusion when the tension fabric loads are applied to it (e.g., outward forces on the outer wall 148). This minimizes PVC extrusion deformation and reduces gap formation between adjacent fabric panels along the corner edge 212 of the display system 100.

Figure 13:
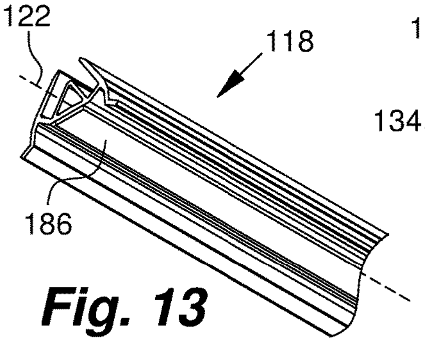
FIG. 13 is a diagrammatic partial view of one example of a cladding element.
Figure 14:
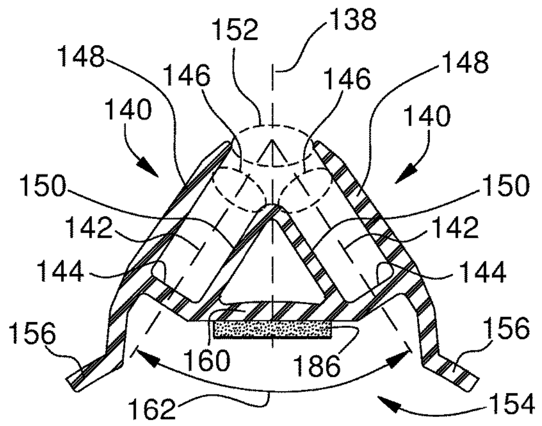
FIG. 14 is a diagrammatic cross-sectional view of the cladding element of FIG. 13.
Figure 17:
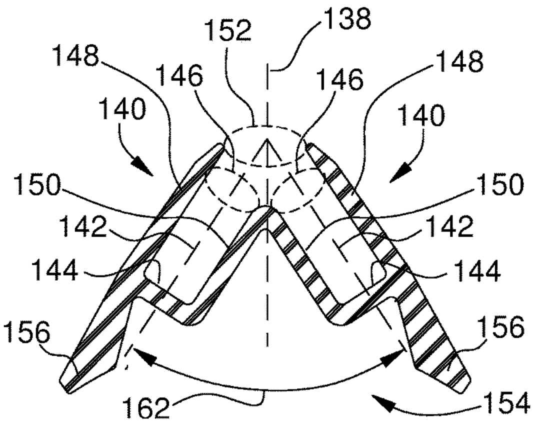
FIG. 17 is a diagrammatic cross-sectional view of the cladding element of FIG. 16.

With reference to FIGS. 13-15 for illustration, a high strength foam adhesive 186 may be pre-applied (for example by the plastic extruding vendor), to all lengths of plastic extrusion to facilitate quick, easy, and cost-effective cladding installation.

Referring again to FIG. 6, the underlying round tube frame member 106 may be made of aluminum and may initially be bent to the desired structural shape. Then the cladding element(s) may be adhered to or otherwise secured to the already-formed frame member shape. The aluminum structure typically provides the overall structural support and shape definition to the cladding. In preferred embodiments, the runs (i.e., lengths) of the PVC cladding may be configured to correspond with the lengths of the respective aluminum frame members so the system can be assembled and disassembled similarly to non-clad round tube structures. In certain embodiments, occasional screws may be used to provide a mechanical fastener backup to the high strength foam adhesive 186. Once attached to the frame member, the cladding is generally not removed but stays permanently adhered to the respective frame member, even when the framework is disassembled. The round tube frame members and overall display system may preferably be designed and configured such that no snap pins or spreader screw heads (or the like) lie in the desired cladding path.

Figure 7:
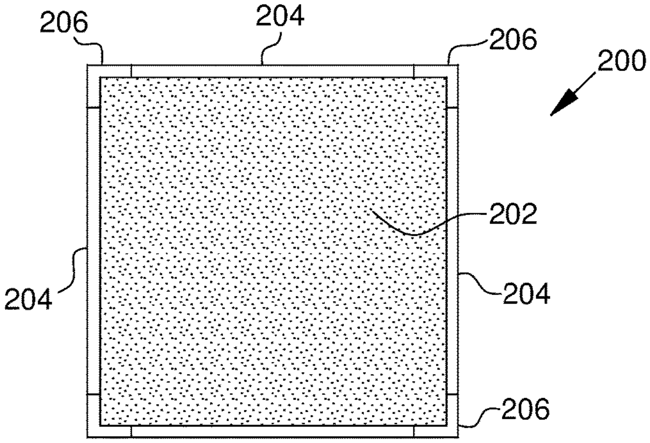
FIG. 7 is a diagrammatic plan view of a panel element in accordance with one non-limited embodiments of the present invention, showing the medial and corner gaskets secured to the periphery of the fabric display substrate.

With reference to FIGS. 7, 15 and 18, in certain preferred display systems 100 in accordance with the present invention, the fabric panels 200 may employ single-ply fabric skins 202 with, for example, 3 mm×12 mm groove gaskets.

It is anticipated that 3D structures generally have ample internal, light absorbing volume and should not need opacity liners. However, some applications may require or find desirable an opacity liner which can be added via two methods. The preferred method is to use a reduced-thickness gasket and to sew both the face fabric and the liner to the same gasket. Alternatively, some very complex shapes may benefit from a liner that could be attached separately to the aluminum frame by way of, for example, hook-and-loop faster elements or the like.

Figure 19:
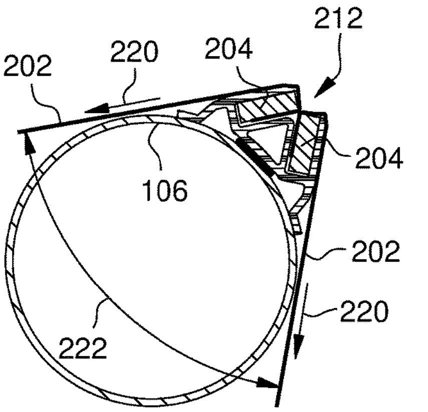
FIG. 19 is a diagrammatic partial cross-sectional view of an assembled display system similar to that of FIG. 15, but wherein the angle between the tensioned panels is approximately 67 degrees.
Figure 19A:
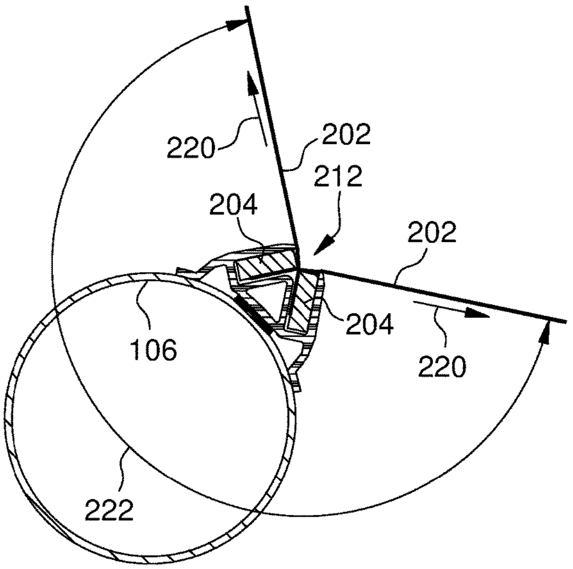

Referring to FIGS. 15, 18 and 19, embodiments of the round tube cladding system described herein are particularly useful for creating an outside corner for four-sided structures (e.g., corners of about 90 degrees). In most embodiments, the minimum fabric angle 222 that will not hit the aluminum tube is expected to be about 67 degrees, meaning that triangular structures (60 degree corners) may show some aluminum frame read thru. Referring to FIG. 19*a* however, in particular embodiments, the fabric angle 222 may reach approximately 270 degrees, making it suitable for inside corners.

As illustrated in FIG. 25, very tight radius bends of the PVC cladding, especially in the horizontal direction, can be aided with stress relief cuts (such as those pictured). Such cuts are easy and quick to make on a band saw, or with equivalent tooling or cutting operation. In certain preferred embodiments, the standard minimum bend radius of the PVC cladding system may be 24" in all directions.

Corner Finishing Detail

Important considerations in the design of round tube clad corners may include the following:

a) Aesthetics. The corners should look clean and finished. This is especially important for corners on structures that are raised in the air.

b) Cost. Complex structures often have non-symmetric and non-uniform corners. It is important that the parts to make a corner and the process for manufacturing the corners be cost effective. This requires a methodology that is quick for both the tech design and manufacturing steps.

c) Durability. Corners are points of contact on assembled structures and thus should be impact resistant and durable. Structures that are designed for assembly, disassembly and transport must withstand the rigors of frequent handling.

d) Flexibility. Corners can range in shape from standard 90 degrees (shown, for example, in FIG. 5) to all imaginably combinations of angles. The corner cladding methodology disclosed herein should effectively accommodate all of these possibilities.

Just running the round tube cladding to the corners may not meet the aesthetics and durability needs of the application. As such, a special injection molded corner clad part 128, made of very tough ABS plastic for example, has been developed.

The ABS corner cladding element 128 is very durable. Round tube corners are typically created with either standard plastic elbows for 90 degree corners (see, for example, FIG. 6) or welded aluminum tube sections for non-standard angles (see, for example, FIG. 26). In either case, these corner ends are typically made with straight sections of round tube. This is ideal for using a very impact tough, rigid, injection molded cladding part at the corners.

Figure 5:
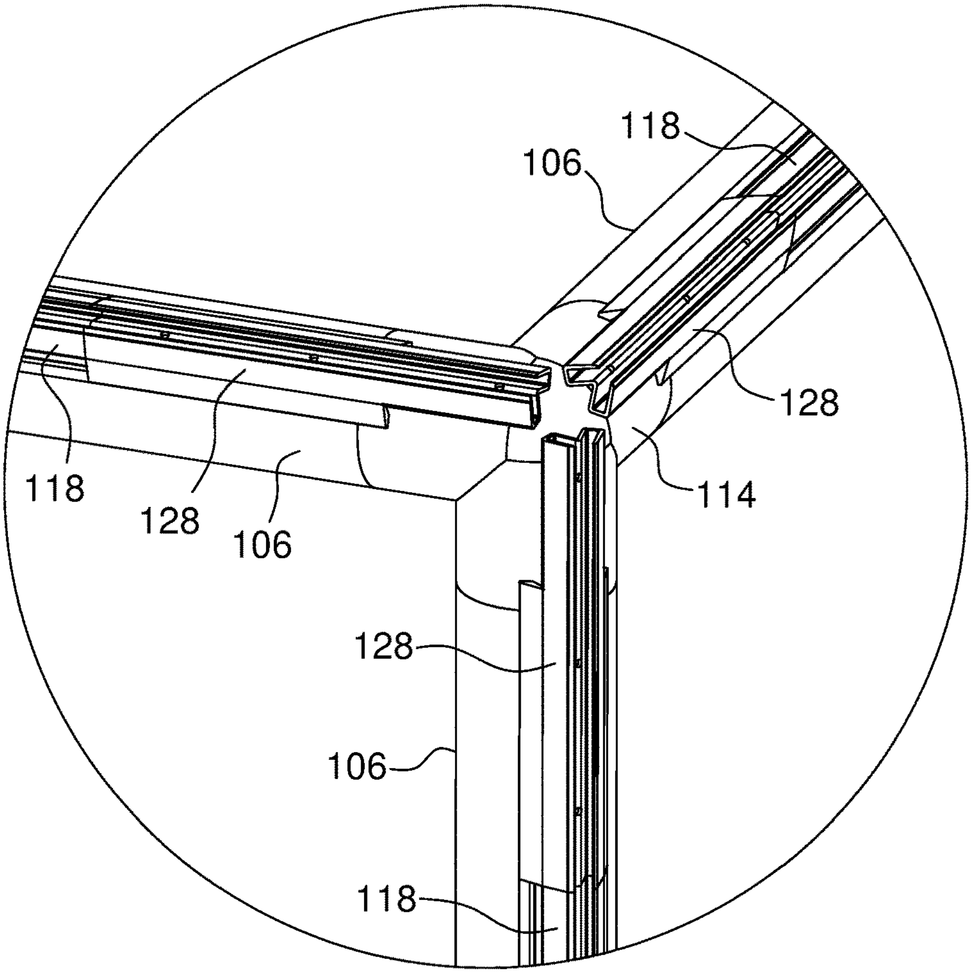
FIG. 5 is a magnified view of detail 5 of FIG. 4, showing a completely clad three-way corner structure.
Figure 10:
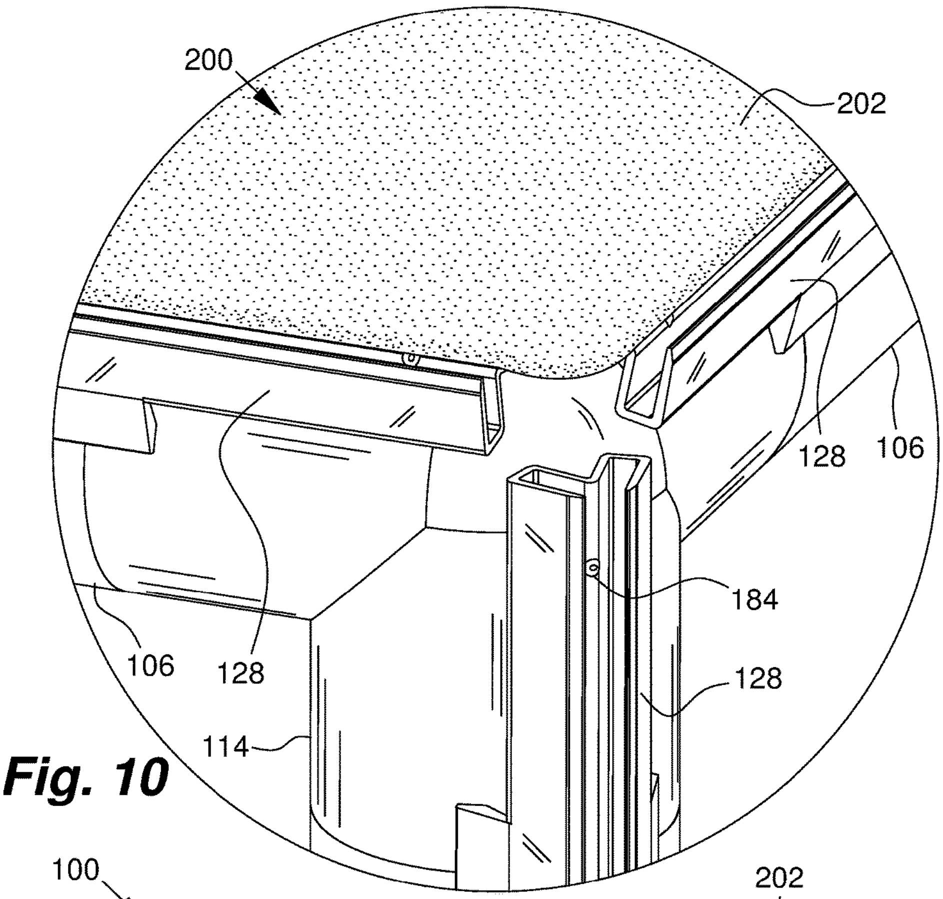
FIG. 10 is a diagrammatic perspective view of a three-way corner structure with a fabric panel having corner gasket sewn to the fabric panel, the gasket being inserted into mounting grooves in respective corner cladding elements.

The ABS corner cladding methodology shown for example in FIGS. 5 and 10 is very flexible in how it can handle different corner angles. Using three independent “legs” at the corner simplifies the design as it eliminates the need for complex 3D part modeling. In addition, this type of three-leg design is fast and simple for manufacturing to install during production.

A preferred embodiment of the round tube cladding and the corner cladding element will match up to each other more exactly so to minimize any visible transition between the pieces. For ease of manufacture, the corner cladding element 128 may attach to the respective tubular frame member 106 via a strong foam tape (similar to the round tube cladding). With reference to FIG. 22, in certain preferred embodiments, the corner cladding elements 128 will not rely on mechanical attachments which protrude into the fabric channels, as such protrusions could interfere with the fabric panel installation on this part. Rather, there may be a laterally-extended flange 180 on the exterior of the part for the addition of rivets (or the like) as needed.

Figure 8:
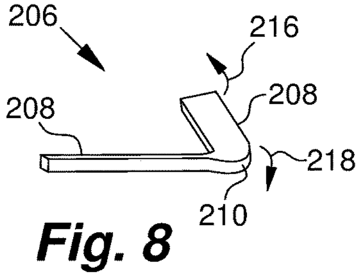
FIG. 8 is a diagrammatic perspective view of a corner gasket.
Figure 9:
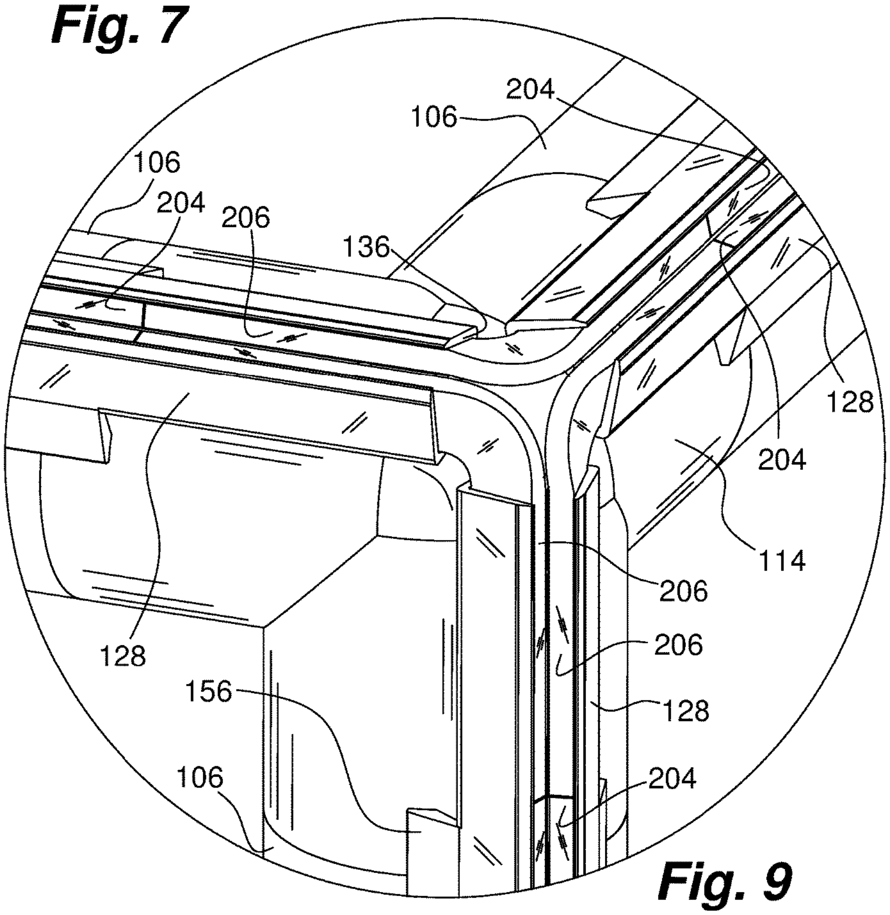
FIG. 9 is a diagrammatic partial view of a clad corner framework in which the medial and corner gaskets of the panel element are shown inserted into their respective gasket grooves, the display substrates being hidden to facilitate viewing of the gasket placements.

Referring to FIGS. 8 and 9, a special molded corner gasket 206 may be provided to work specifically with the corner clad parts to bridge the small gap between parts and make a quality finished fabric corner. Preferred embodiments of such corner gasket may be uniquely configured with a number of characteristics. The gasket may have a rounded corner shape so the fabric can be sewn continuously around the corner giving a very finished appearance. Further, the straight ends (or “legs”) 208 of the gasket may be rotated upward (as shown at 216) so they match the angles of the gasket grooves in the corner cladding elements 128, resulting in a smooth appearance to the installed fabric panel 200. In addition, the gasket corner 210 may be rolled downward (e.g., as shown at 218) so that when three gasketed fabric panels come together (e.g., held in place by the corner cladding), the fabric corners roll inward over the frame end.

Such a feature results in an improved covered and finished corner which facilitates using the discontinuous three leg corner clad approach.

The 3D molded corner gasket may work with the molded corner cladding as a critical matched pair allowing the three-legged corner clad concept to work most effectively. Referring to FIG. 10, the end result is a visually clean and finished fabric corner that is cost effective and durable. Notably, experiments with flat 2D cut corner gaskets, without the rotated ends and rolled corner, resulted in fabric panels that, when under tension, pulled on the fabric corners which rolled outward away from the frame end. This was not visually acceptable and led to the development of this special 3D molded gasket.

In-Line Break Detail

With reference to FIG. 24, large and/or portable frame systems may require cladding elements 118 which are specially configured and positioned to account for in-line breaks of the tubing. Such breaks may be necessary or useful for disassembly and transportation of the display system. For example, a snap pin 194 and snap pin aperture 196 may be provided to establish a temporarily secure rigid, in-line connections between frame members. Moreover, male-female round tube union presents unique challenges in connection with the present invention, in that the female side of the joint should preferably be devoid of mechanical fastener elements protruding into the tube as such elements would likely interfere with the insertion of the male side into the tube of the female side.

The round tube cladding is preferably affixed to the aluminum round tube frame member 106 along its entire length by a very strong foam tape. Screws (or the like) may be used at the cladding breaks, and occasionally along its length, to back up the tape and keep the cladding secure. It may be particularly preferable on round tube frame members to ensure strong cladding adhesion at the ends of the cladding sections to prevent the cladding from starting to peel away from the respective frame member over time or when the frame is exposed to higher temperatures.

Method #1: wire tie. With reference to FIG. 24 for illustration, by locating at least two small holes 192 at the base of the PVC cladding, a wire tie 190 can easily be run around the tube 106 to hold the cladding end securely in place. The wire tie may pass thru the two holes in the cladding and under the fabric grooves of the cladding. A small section of the foam tape on the bottom side of the cladding may be cut away to provide a gap for the wire tie to pass thru. This wire tie method is a fast, inexpensive and reliable solution to securing the cladding on a female side of a snap-in style, in-line tube break.

Method #2: heat gun. a heat gun can also be used as part of a process to effectively secure the end of a cladding section at a curved tube break. This method requires the cladding end be warmed with a heat gun and slightly bent to match the radius of the tube. Then the cladding is affixed to the aluminum tube and a standard securing screw (or the like) is located (for example, 3.25") back from the cladding end or just outside the reach of the male insert when installed into the female side. In one example embodiment of a method, the cladding may preferably be warmed for approximately 10-15 seconds on a setting of, for example, 750 F. on the heat gun and then just gently re-shaped. This process is relatively easy to accomplish and is reproducible. The end is re-shaped this way just prior to installing the cladding on the aluminum tube frame member. In particular embodiments, this heat gun method may produce a cleaner end product by, for example, avoiding the need for wire ties. However, this method may require a little more skill on the part of the fabricator to avoid overheating and adversely deforming the cladding.

A corner may be easily clad (e.g., with corner clad elements) by installing the three injection molded legs (e.g., corner clad elements 128) by first using the pre-applied foam tape and then additionally securing with, for example, one or more rivets. Once the corners are clad, the remaining tube cladding elements 118 can be butted up against the corner clad elements and easily run along each tube 106.

Referring to the various figures, a cladding element (such as those shown at 118 and 128 for example) may facilitate sharp joint edges 212 between adjacent tensioned panel elements 200 on display systems with round tubular frame members 106. With particular reference to FIGS. 13-18, the cladding element may preferably comprise a longitudinal axis 122 along which the cladding element is elongated, a center axis 138, a pair of gasket grooves 140, and a frame alignment channel 154. Each gasket groove 140 extends parallel with the longitudinal axis 122, and has a floor portion 144, a mouth portion 146 disposed oppositely of the floor portion 144, an outer wall 148 and an inner wall 150 disposed oppositely of the outer wall. These grooves 140 are configured to securingly (but manually-removably) receive a mounting gasket (for example, 204 and/or 206) of a respective panel element 200 by way of the mouth portion 146. The frame alignment channel 154 is configured to receivingly engage a portion (for example, the outer surface) of a round tubular frame member 106 elongated along a tube axis 108, whereby the longitudinal axis remains parallel with the tube axis (see, for example FIG. 23).

With reference to FIGS. 3, 4, 7 and 11, in typical embodiments of a system 100, a panel element 200 will be disposed in tension across a frame segment aperture 103 defined by a multiplicity of tubular frame members 106, wherein the cladding elements (e.g., 118 and 128) act as the connective interface between the panel element 200 and the assembled tubular framework 102.

As illustrated by the embodiments depicted herein, the gasket grooves 140 of a cladding element may be canted toward one another such that their mouth portions 146 are closer to one another than their floor portions 144. Moreover, as shown for example in FIGS. 14 and 17, at a cross-section of the cladding element each gasket groove 140 may include a groove axis 142 extending from the floor portion 144 to the mouth portion 146. In certain embodiments of a cladding element, the groove axes 142 may have a relative angle 162 of between 90 and 45 degrees from one another. In particular preferred embodiments of a cladding element, this relative groove angle 162 may be 67 degrees.

In particular embodiments of a cladding element (shown at 118 or 128 for example), the outer walls 148 may define a unitary slot 152 outward of the mouth portions 146. Furthermore, the inner walls 150 may intersect one another at, for example, the mouth portions 146. A web portion 160 may even extend between the floor portions 144, thereby defining a closed contour (for example, the triangle contour seen in FIGS. 13 and 14) in combination with the inner walls 150. A cladding element such as the one shown at 118 may be comprised of extruded polyvinyl chloride (PVC) or the like.

The frame alignment channel 154 may be defined at least in part by a pair of laterally-disposed foot flanges 156. With reference to FIGS. 20 an 21, in certain preferred embodiments of a cladding element 118, each foot flange 156 may include a toe flange 158 projecting therefrom, to act as a stiffener and help minimize the deflection of the outer wall 148 and foot 156 when the panel tensioning forces are applied.

Figure 6:
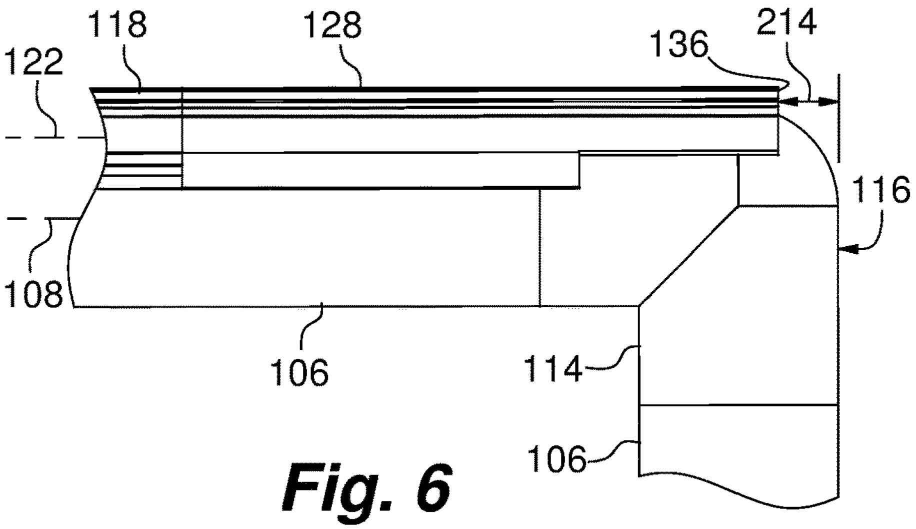
FIG. 6 is a diagrammatic side view of a partially-clad framework, illustrating the inset of the corner cladding element from the terminal edge of the connector element.
Figure 16:
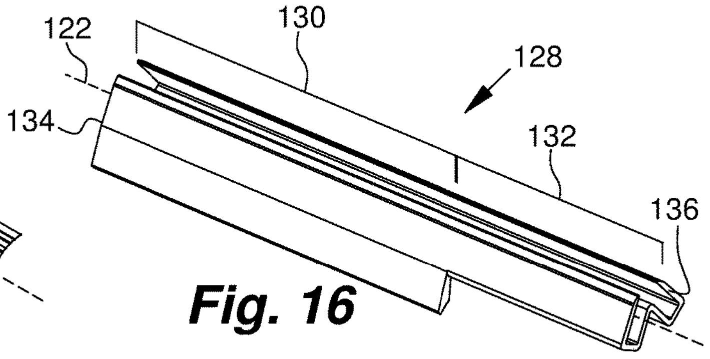
FIG. 16 is a diagrammatic partial view of one example of a corner cladding element.

Referring to FIG. 16, a corner cladding element 128 may extend from an inner end 134 and an outer end 136. In addition, the corner cladding element 128 may be divisible along the longitudinal axis 122 between an inner segment 130 and an outer segment 132, wherein the outer segment may lack foot flanges 156. Such embodiments may preferably be used proximate the corners of the framework, as illustrated in FIGS. 4, 5, 6, 9 and 10. Moreover, such "corner" cladding elements 128 may preferably be comprised of ABS plastic, and may preferably be securable to the respective tubular member 106 by way of one or more rivets 186. FIG. 6 illustrates how the outer end 136 of the corner cladding element 128 is preferably placed at an inset distance 214 from the terminal edge 116 of the connector element 114.

Referring to FIG. 25, in order to facilitate lateral bending of a cladding element 118 to follow lateral curvature of a corresponding frame member, a plurality of laterally-extending relief cuts 198 may be provided in the foot flanges 156.

Referring to FIGS. 13-15, an elongated strip of adhesive foam tape 186 may be provided, one side of which may be secured within the frame alignment channel (for example, under web portion 160) for convenient adhesive attachment of the cladding element 118 to the tubular frame member 116. With reference to FIG. 21, it is noted that a protective peel layer 188 may remain on other side of the tape strip 186 until such time as the cladding element 118 is to be applied to the selected tubular frame member 106.

Figure 1:
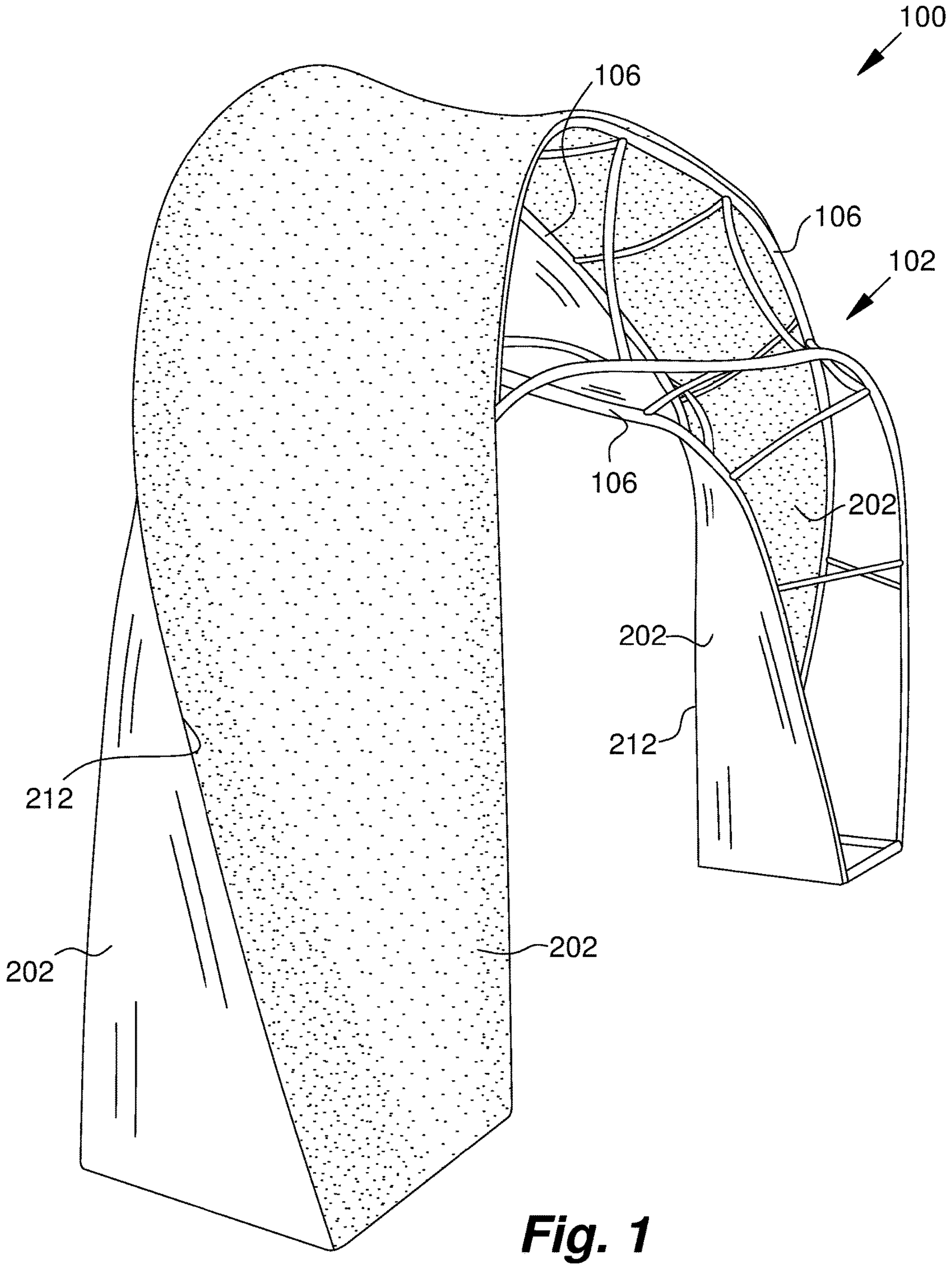
FIG. 1 is a perspective view of a partially assembled example embodiment of a display system in accordance with the present invention, wherein the framework comprises round tubular frame members (i.e., round cross-sections) bent into a complex shape and only two of four fabric panels are installed on the respective framework by way of tube cladding elements.
Figure 2:
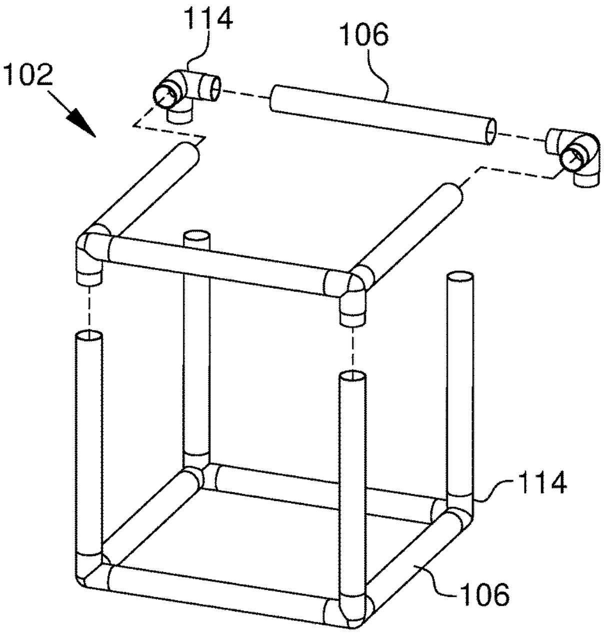
FIG. 2 is a partial exploded view of an example tubular framework, including the assembly of tubular frame members with tube connector elements.
Figure 3:
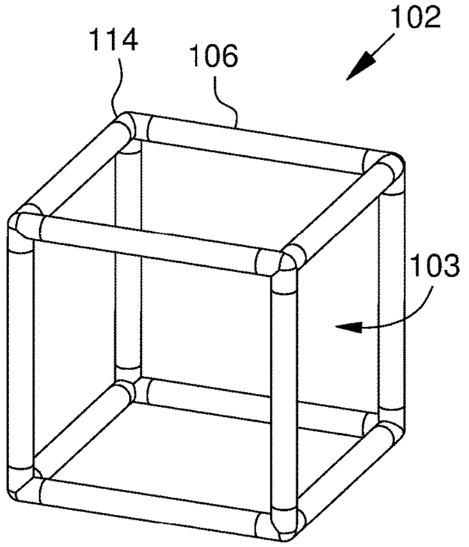
FIG. 3 is a diagrammatic perspective view of the tubular framework of FIG. 2, but fully assembled.
Figure 4:
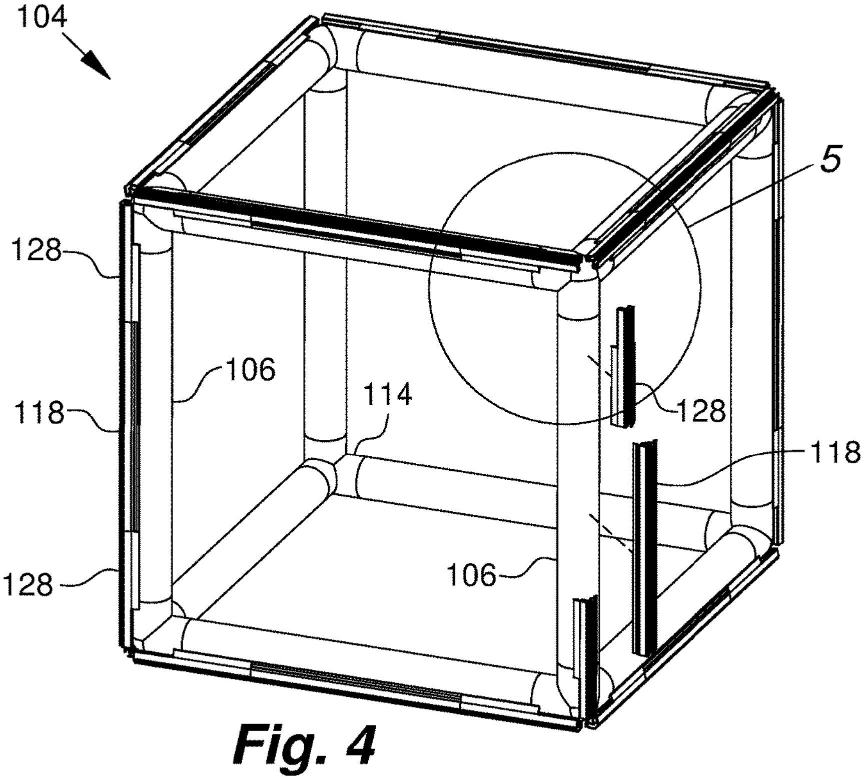
FIG. 4 is a diagrammatic perspective view of a cladded tubular framework in accordance with an example embodiment of a display system.
Figure 11:
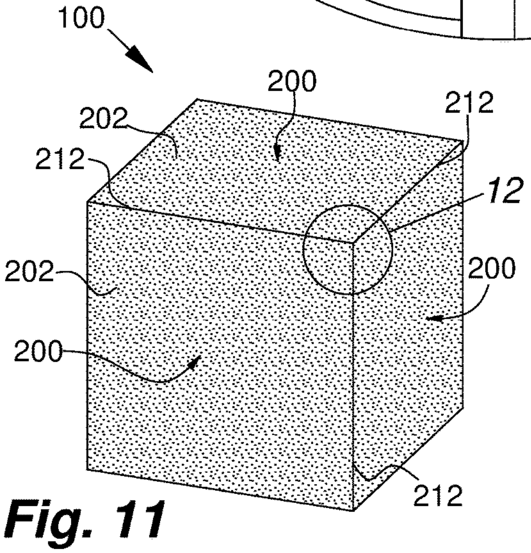
FIG. 11 is a diagrammatic perspective view of a fully-assembled display system in accordance with one non-limiting embodiment of the present invention.

With reference to FIGS. 1 and 11, embodiments of a display system 100 may comprise at least on tubular frame member 106, a pair of panel elements 200 and a cladding element (for example, 118 or 128). The round tubular frame member 106 is generally elongated along a tube axis 108. Referring to FIG. 7, each panel element 200, may have a flexible display substrate 202 (e.g., fabric) and at least a mounting gasket (204 or 206) attached at the periphery of the display substrate 202. Referring to FIGS. 14, 15, 17 and 18, the cladding element is configured to be in secure receipt of the mounting gasket of a respective panel element 200. The cladding element's frame alignment channel 154 is in receiving engagement with a portion of the outer surface of the round tubular frame member 106, whereby the longitudinal axis 122 remains parallel with the tube axis 108. As illustrated in FIG. 23, the tube axis 108 may be curved.

Referring to FIGS. 15, 18 and 19, depending upon the embodiment of the system 100, the display substrates 202 may extend from the cladding element under tension 220 in respective directions at an angle of between 67 and 90 degrees with respect to one another, while maintaining a tight panel joint edge 212.

Figure 12:
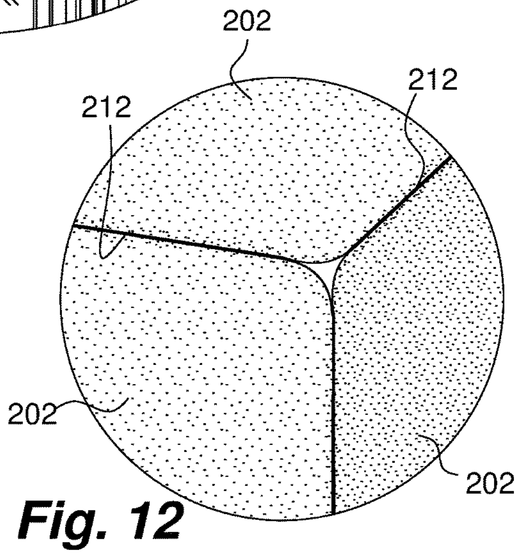
FIG. 12 is a magnified view of detail 12 of FIG. 11, showing a completely clad three-way corner structure.

Certain embodiments of a display system may comprise at least three round tubular frame members 106, three panel elements 200, and three cladding elements 128. The three round tubular frame members 106 may be, for example, connected at various angles (e.g., right angle, greater than 90 degrees, and less than 90 degrees) with respect to one another by an appropriately configured tube connector element 114. Referring to FIG. 7, each panel element 200 may have a flexible display substrate 200 and corner mounting gasket 206 attached (e.g., sewn) to the corner of a periphery of the display substrate 202. Referring to FIG. 8, each corner mounting gasket 206 may include a gasket tip 210 and a pair of gasket legs 208 extending therefrom. The gasket legs 208 of the corner mounting gaskets 206 may preferably have a pitch angle in one direction 216 with respect to the gasket tip (which may be pitched in the opposite direction 218). This helps to accommodate the angles at which the gasket legs 208 are inserted and maintained within the respective gasket groove 140, while simultaneously allowing the tip 210 to remain in a level position in order to maintain the tight, sharp esthetics of the corner of the assembled display system 100. See, for example, FIGS. 10-12. In FIG. 9, the display substrates are hidden from view so that one can see how the gaskets fit into the respective gasket grooves when the system is assembled. However, typically the mounting gaskets are permanently affixed to the display substrate 202 (e.g., having been sewn to the display substrate), even before assembly of the display system 100.

Referring to FIG. 26, the angle between the gasket legs of a corner gasket 206 may be adapted to correspond to the respective joint angle between the intersecting tube axes 108 and longitudinal axes 122 at that corner. For example, the gasket legs of corner gasket 206*a* are arranged at a relative angle of less than 90 degrees with respect to one another. Contrastingly, the gasket legs of corner gasket 206*b* are arranged at a relative angle of greater than 90 degrees with respect to one another.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cladding element for facilitating sharp joint edges between adjacent tensioned panel elements on display systems with round tubular frame members, the cladding element comprising:
- (a) a longitudinal axis along which the cladding element is elongated;
- (b) a pair of gasket grooves, each gasket groove
  - (i) extending parallel with the longitudinal axis,
  - (ii) having a floor portion, a mouth portion disposed oppositely of the floor portion, an outer wall and an inner wall disposed oppositely of the outer wall, and
  - (iii) being configured to securingly receive a mounting gasket of a respective panel element by way of the mouth portion; and
- (c) a frame alignment channel configured to receivingly engage a portion of a round tubular frame member elongated along a tube axis, whereby the longitudinal axis remains parallel with the tube axis;

wherein the gasket grooves are canted toward one another such that their mouth portions are closer to one another than their floor portions.

2. A cladding element as defined in claim 1 wherein
- (a) the cladding element has a cross-section;
- (b) at the cross-section, each gasket groove includes a groove axis extending from the floor portion to the mouth portion; and
- (c) the groove axes have a relative angle of between 90 and 45 degrees from one another.

3. A cladding element as defined in claim 1 wherein the frame alignment channel is defined at least in part by a pair of laterally-disposed foot flanges.

4. A cladding element as defined in claim 3 wherein each foot flange includes a toe flange projecting therefrom.

5. A cladding element as defined in claim 3 divisible along the longitudinal axis between an inner segment and an outer segment, wherein the outer segment lacks foot flanges.

6. A cladding element as defined in claim 3 further comprising a plurality of laterally-extending relief cuts in the foot flanges.

7. A cladding element as defined in claim 1 further comprising an elongated strip of adhesive foam tape, one side of which is secured within the frame alignment channel for adhesive attachment of the cladding element to the tubular frame member.

8. A cladding element for facilitating sharp joint edges between adjacent tensioned panel elements on display systems with round tubular frame members, the cladding element comprising:

(a) a longitudinal axis along which the cladding element is elongated;

(b) a pair of gasket grooves, each gasket groove (i) extending parallel with the longitudinal axis, (ii) having a floor portion, a mouth portion disposed oppositely of the floor portion, an outer wall and an inner wall disposed oppositely of the outer wall, and (iii) being configured to securingly receive a mounting gasket of a respective panel element by way of the mouth portion; and (c) a frame alignment channel configured to receivingly engage a portion of a round tubular frame member elongated along a tube axis, whereby the longitudinal axis remains parallel with the tube axis;

wherein the outer walls define a unitary slot outward of the mouth portions.

9. A cladding element as defined in claim 8 wherein the inner walls intersect one another at the mouth portions.

10. A cladding element as defined in claim 9 further comprising a web portion extending between the floor portions, thereby defining a closed contour in combination with the inner walls.

11. A cladding element as defined in claim 10 comprised of extruded polyvinyl chloride (PVC).

12. A display system comprising:

(a) a round tubular frame member elongated along a tube axis;

(b) a pair of panel elements, each panel element having a flexible display substrate and at least a mounting gasket attached at the periphery of the display substrate;

(c) a cladding element elongated along a longitudinal axis, the cladding element (i) having a pair of gasket grooves, each gasket groove extending parallel with the longitudinal axis and having a floor portion, a mouth portion disposed oppositely of the floor portion, an outer wall and an inner wall disposed oppositely of the outer wall, (iii) being in secure receipt of the mounting gasket of a respective panel element; and (iv) having a frame alignment channel in receiving engagement with a portion of the round tubular frame member, whereby the longitudinal axis remains parallel with the tube axis.

13. A display system as defined in claim 12 wherein the gasket grooves are canted toward one another such that their mouth portions are closer to one another than their floor portions.

14. A display system as defined in claim 12 wherein the outer walls define a unitary slot outward of the mouth portions.

15. A display system as defined in claim 14 wherein the inner walls intersect one another at the mouth portions and a web portion extends between the floor portions, thereby defining a closed contour in combination with the inner walls.

16. A display system as defined in claim 12 wherein the tube axis is curved.

17. A display system as defined in claim 12 wherein the display substrates extend from the cladding element under tension in respective directions at an angle of between 67 and 90 degrees with respect to one another.

18. A display system comprising:

(a) three round tubular frame members connected at angles with respect to one another by a tube connector element, each round tubular member being elongated along a respective tube axis, (b) three panel elements, each panel element having a flexible display substrate and a corner mounting gasket attached to the corner of a periphery of the display substrate, each corner mounting gasket including a gasket tip and a pair of gasket legs extending therefrom; and (c) three cladding elements, each cladding element being elongated along a longitudinal axis and having a pair of gasket grooves, each gasket groove extending parallel with the respective longitudinal axis, and having a floor portion, a mouth portion disposed oppositely of the floor portion, an outer wall and an inner wall disposed oppositely of the outer wall, each gasket groove being in secure receipt of a respective one of the gasket legs; each cladding element having a frame alignment channel in receiving engagement with a portion of a respective round tubular frame member, whereby the longitudinal axis remains parallel with the respective tube axis.

19. A display system as defined in claim 18 wherein each of the angles is less than 180 degrees.

20. A display system as defined in claim 18 wherein each of the angles is 90 degrees or less.

21. A display system as defined in claim 18 wherein in each cladding element, the gasket grooves are canted toward one another such that the mouth portions are closer to one another than the floor portions, and the outer walls define a unitary slot outward of the mouth portions.

22. A display system as defined in claim 18 wherein the gasket legs of the corner mounting gaskets have a pitch angle with respect to the gasket tip.

* * * * *